United States Patent [19]
Burges

[11] Patent Number: 6,134,344
[45] Date of Patent: Oct. 17, 2000

[54] METHOD AND APPARATUS FOR IMPROVING THE EFFICIENCY OF SUPPORT VECTOR MACHINES

[75] Inventor: Christopher John Burges, Freehold, N.J.

[73] Assignee: Lucent Technologies Inc., Murray Hill, N.J.

[21] Appl. No.: 08/883,193

[22] Filed: Jun. 26, 1997

[51] Int. Cl.$^7$ .................................................. G06K 9/00
[52] U.S. Cl. ........................ 382/155; 382/156; 382/225; 382/253
[58] Field of Search .................................. 382/155, 156, 382/157, 158, 159, 160, 161, 253, 225

[56] References Cited

U.S. PATENT DOCUMENTS

| | | | |
|---|---|---|---|
| 4,259,661 | 3/1981 | Todd | 340/146.3 |
| 4,661,913 | 4/1987 | Wu et al. | 364/497 |
| 5,355,088 | 10/1994 | Howard, Jr. | 324/323 |
| 5,467,457 | 11/1995 | Alexander et al. | 395/497 |
| 5,479,523 | 12/1995 | Gaborski et al. | 382/159 |
| 5,546,472 | 8/1996 | Levin | 382/131 |
| 5,577,135 | 11/1996 | Grajski et al. | 382/253 |
| 5,647,058 | 7/1997 | Agrawal et al. | 395/601 |
| 5,664,067 | 9/1997 | Moed et al. | 395/24 |
| 5,794,178 | 8/1998 | Caid et al. | 345/334 |
| 5,872,865 | 2/1999 | Normile et al. | 382/165 |

OTHER PUBLICATIONS

C. J. Burges "Simplified Support Vector Decision Rules" Machine Learning, Proceedings of the Thirteenth International Conference (ICML '96), Proceedings of the Thirteenth International Conference on Machine Learning, Bari, Italy, Jul. 3–6, 1996, pp. 71–77, XP002087853 1996, San Francisco, CA, USA, Morgan Kaufmann Publishers, USA *the whole document* particularly relevant if taken alone.

C. J. C. Burges, "A tutorial on support vector machines for pattern recognition", Data Mining and Knowledge Discovery, 1998, Kluwer Academic Publishers, Netherlands, vol. 2, No. 2, pp. 121–167, XP))2087854, ISSN 1384–5810 *the whole document* theory or principle underlying the invention.

*Primary Examiner*—Matthew Bella
*Assistant Examiner*—Sheela Chawan
*Attorney, Agent, or Firm*—Joseph J. Opalach

[57] ABSTRACT

A method and apparatus is described for improving the efficiency of any machine that uses an algorithm that maps to a higher dimensional space in which a given set of vectors is used in a test phase. In particular, reduced set vectors are used. These reduced set vectors are different from the vectors in the set and are determined pursuant to an optimization approach other than the eigenvalue computation used for homogeneous quadratic kernels. An illustrative embodiment is described in the context of a support vector machine (SVM).

3 Claims, 3 Drawing Sheets

FIG. 1
(PRIOR ART)
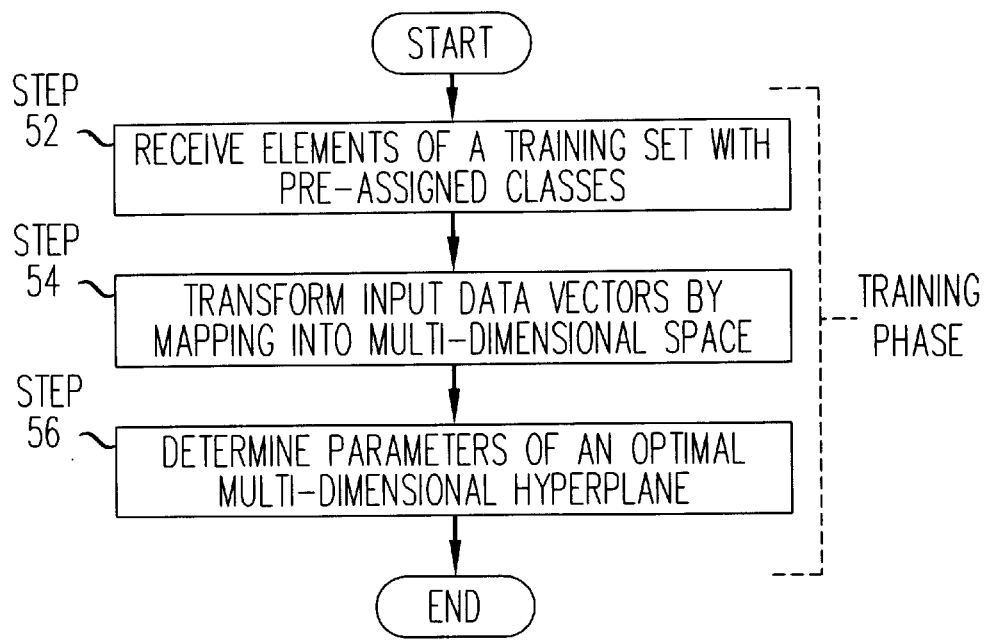
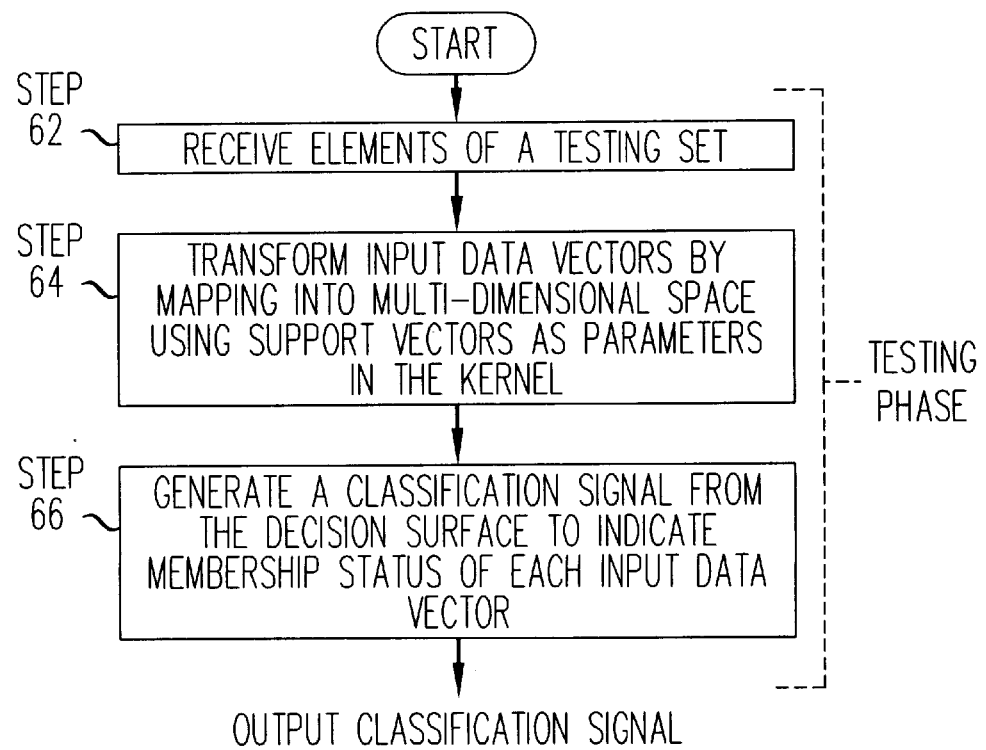

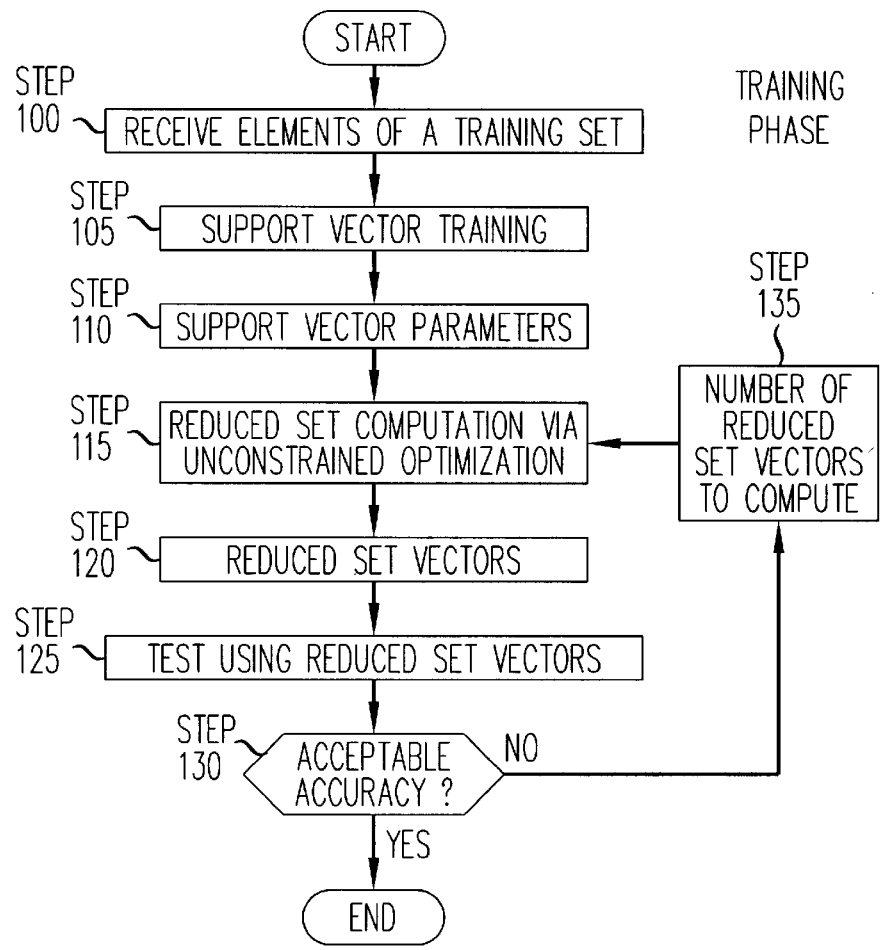
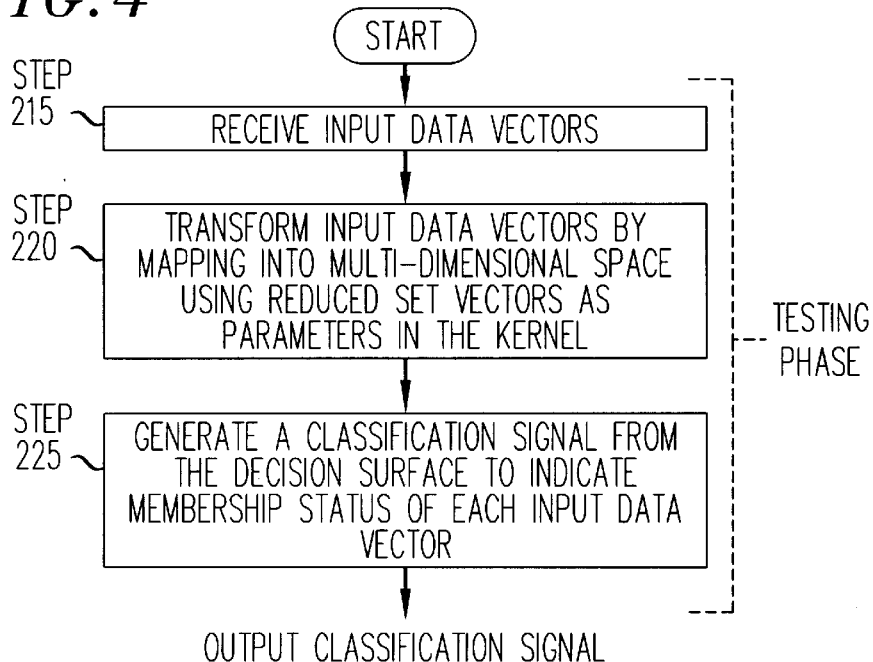

METHOD AND APPARATUS FOR IMPROVING THE EFFICIENCY OF SUPPORT VECTOR MACHINES

FIELD OF THE INVENTION

This invention relates generally to universal learning machines, and, in particular, to support vector machines.

BACKGROUND OF THE INVENTION

A Support Vector Machine (SVM) is a universal learning machine whose decision surface is parameterized by a set of support vectors, and by a set of corresponding weights. An SVM is also characterized by a kernel function. Choice of the kernel determines whether the resulting SVM is a polynomial classifier, a two-layer neural network, a radial basis function machine, or some other learning machine. A decision rule for an SVM is a function of the corresponding kernel function and support vectors.

An SVM generally operates in two phases: a training phase and a testing phase. During the training phase, the set of support vectors is generated for use in the decision rule. During the testing phase, decisions are made using the particular decision rule. Unfortunately, in this latter phase, the complexity of computation for an SVM decision rule scales with the number of support vectors, $N_S$, in the support vector set.

SUMMARY OF THE INVENTION

We have realized a method and apparatus for improving the efficiency of any machine that uses an algorithm that maps to a higher dimensional space in which a given set of vectors is used in a test phase. In particular, and in accordance with the principles of the invention, reduced set vectors are used. The number of reduced set vectors is smaller than the number of vectors in the set. These reduced set vectors are different from the vectors in the set and are determined pursuant to an optimization approach other than the eigenvalue computation used for homogeneous quadratic kernels.

In an embodiment of the invention, an SVM, for use in pattern recognition, utilizes reduced set vectors, which improves the efficiency of this SVM by a user-chosen factor. These reduced set vectors are determined pursuant to an unconstrained optimization approach.

In accordance with a feature of the invention, the selection of the reduced set vectors allows direct control of performance/complexity trade-offs.

In addition, the inventive concept is not specific to pattern recognition and is applicable to any problem where the Support Vector algorithm is used (e.g., regression estimation).

BRIEF DESCRIPTION OF THE DRAWINGS

FIG. 1 is a flow chart depicting the operation of a prior art SVM;

FIG. 3 shows an illustrative method for training an SVM system in accordance with the principles of the invention;

FIG. 4 shown an illustrative method for operating an SVM system in accordance with the principles of the invention.

DETAILED DESCRIPTION

Figure 2:
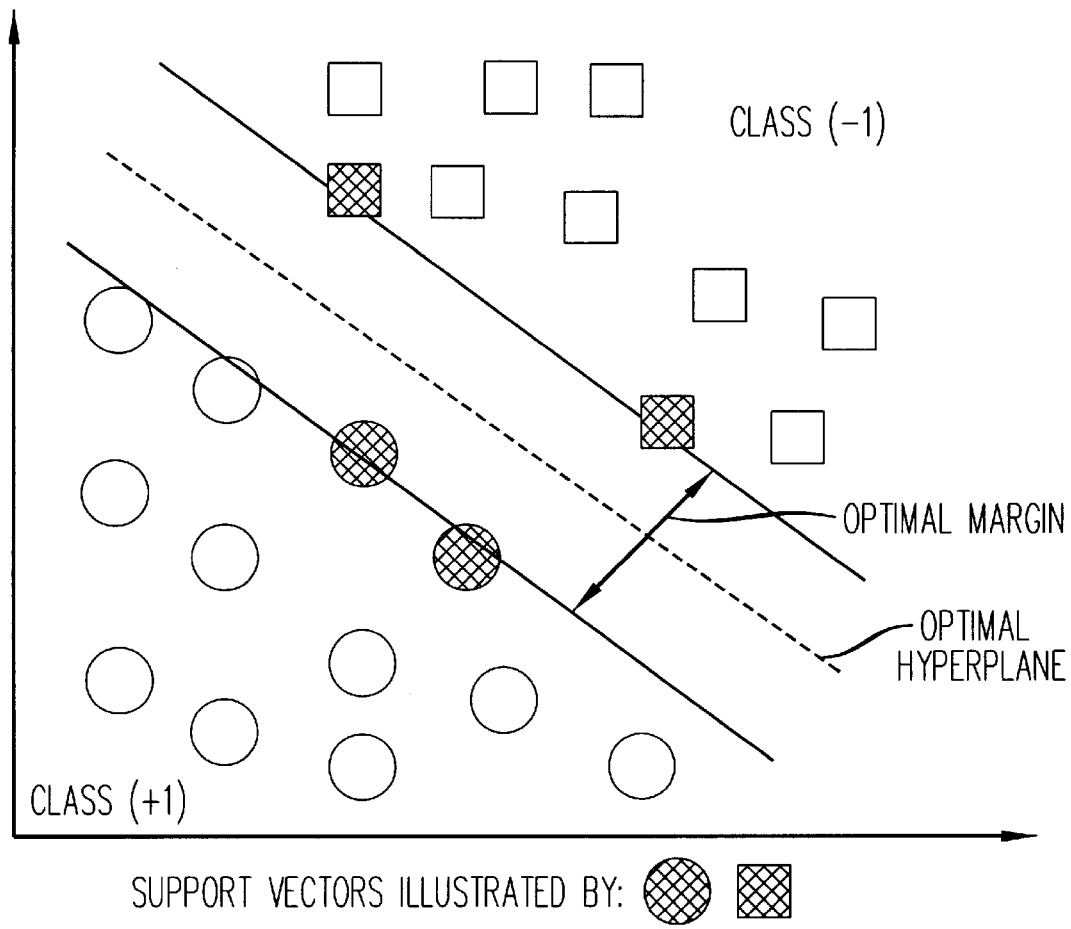
FIG. 2 is an general representation of the separation of training data into two classes with representative support vectors.

Before describing an illustrative embodiment of the invention, a brief background is provided on support vector machines, followed by a description of the inventive concept itself. Other than the inventive concept, it is assumed that the reader is familiar with mathematical notation used to generally represent kernel-based methods as known in the art. Also, the inventive concept is illustratively described in the context of pattern recognition. However, the inventive concept is applicable to any problem where the Support Vector algorithm is used (e.g., regression estimation).

In the description below, it should be noted that test data was used from two optical character recognition (OCR) data sets containing grey level images of the ten digits: a set of 7,291 training and 2,007 test patterns, which is referred to herein as the "postal set" (e.g., see L. Bottou, C. Cortes, H. Drucker, L. D. Jackel, Y. LeCun, U. A. Müller, E. Säckinger, P. Simard, and V. Vapnik, *Comparison of Classifier Methods: A Case Study in Handwritten Digit Recognition,* Proceedings of the 12th IAPR International Conference on Pattern Recognition, Vol. 2, IEEE Computer Society Press, Los Alamos, Calif., pp. 77–83, 1994; and Y. LeCun, B. Boser, J. S. Denker, D. Henderson, R. E. Howard, W. Hubbard, L. D. Jackel, *Backpropagation Applied to Handwritten ZIP Code Recognition,* Neural Computation, 1, 1989, pp. 541–551), and a set of 60,000 training and 10,000 test patterns from NIST Special Database 3 and NIST Test Data 1, which is referred to herein as the "NIST set" (e.g., see, R. A. Wilkinson, J. Geist, S. Janet, P. J. Grother, C. J. C. Burges, R. Creecy, R. Hammond, J. J. Hull, N. J. Larsen, T. P. Vogl and C. L. Wilson, *The First Census Optical Character Recognition System Conference,* U.S. Department of Commerce, NIST, August 1992). Postal images were 16×16 pixels and NIST images were 28×28 pixels.

BACKGROUND—SUPPORT VECTOR MACHINES

In the following, bold face is used for vector and matrix quantities, and light face for their components.

Consider a two-class classifier for which the decision rule takes the form:

$$y = \Theta\left(\sum_{i=1}^{N_S} \alpha_i K(x, s_i) + b\right), \tag{1}$$

where x, $s_i \in R^d$, $\alpha_i$, $b \in R$, and $\Theta$ is the step function; $R^d$ is the d-dimensional Euclidean space and R is the real line, $\alpha_i$, $s_i$, $N_s$ and b are parameters and x is the vector to be classified. The decision rule for a large family of classifiers can be cast in this functional form: for example, $K=(x \cdot s_i)^P$ implements a polynomial classifier; $K=\exp(-\|x-s_i\|^2/\sigma^2)$ implements a radial basis function machine; and $K=\tanh(\gamma(x \cdot s_i)+\delta)$ implements a two-layer neural network (e.g., see V. Vapnik, *Estimation of Dependencies Based on Empirical Data,* Springer Verlag, 1982; V. Vapnik, *The Nature of Statistical Learning Theory,* Springer Verlag, 1995; Boser, B. E., Guyon, I. M., and Vapnik, V., *A training algorithm for optimal margin classifiers,* Fifth Annual Workshop on Computational Learning Theory, Pittsburgh ACM 144–152, 1992; and B. Schölkopf, C. J. C. Burges, and V. Vapnik, *Extracting Support Data for a Given Task,* Proceedings of the First International Conference on Knowledge Discovery and Data Mining, AAAI Press, Menlo Park, Calif., 1995).

The support vector algorithm is a principled method for training any learning machine whose decision rule takes the form of Equation (1): the only condition required is that the kernel K satisfy a general positivity constraint (e.g., see *The Nature of Statistical Learning Theory,* and *A training algorithm for optimal margin classifiers,* cited above). In contrast to other techniques, the SVM training process determines the entire parameter set $\{\alpha_i, s_i, N_s \text{ and } b\}$; the resulting $s_i$, $i=1, \ldots, N_s$ are a subset of the training set and are called support vectors.

Support Vector Machines have a number of striking properties. The training procedure amounts to solving a constrained quadratic optimization problem, and the solution found is thus guaranteed to be the unique global minimum of the objective function. SVMs can be used to directly implement Structural Risk Minimization, in which the capacity of the learning machine can be controlled so as to minimize a bound on the generalization error (e.g., see *The Nature of Statistical Learning Theory,* and *Extracting Support Data for a Given Task,* cited above). A support vector decision surface is actually a linear separating hyperplane in a high dimensional space; similarly, SVMs can be used to construct a regression, which is linear in some high dimensional space (e.g., see *The Nature of Statistical Learning Theory,* cited above).

Support Vector Learning Machines have been successfully applied to pattern recognition problems such as optical character recognition (OCR) (e.g., see *The Nature of Statistical Learning Theory,* and *Extracting Support Data for a Given Task,* cited above, and C. Cortes and V. Vapnik, *Support Vector Networks,* Machine Learning, Vol 20, pp 1–25, 1995), and object recognition.

FIG. 1 is a flow chart depicting the operation of a prior art SVM. This operation comprises two phases: a training phase and a testing phase. In the training phase, the SVM receives elements of a training set with pre-assigned classes in step 52. In step 54, the input data vectors from the training set are transformed into a multi-dimensional space. In step 56, parameters (i.e., support vectors and associated weights) are determined for an optimal multi-dimensional hyperplane.

FIG. 2 shows an example where the training data elements are separated into two classes, one class represented by circles and the other class represented by boxes. This is typical of a 2-class pattern recognition problem: for example, an SVM which is trained to separate patterns of "cars" from those patterns that are "not cars." An optimal hyperplane is the linear decision function with maximal margin between the vectors of two classes. That is, the optimal hyperplane is the unique decision surface which separates the training data with a maximal margin. As illustrated in FIG. 2, the optimal hyperplane is defined by the area where the separation between the two classes is maximum. As observed in FIG. 2, to construct an optimal hyperplane, one only has to take into account a small subset of the trained data elements which determine this maximal margin. This subset of training elements that determines the parameters of an optimal hyperplane are known as support vectors. In FIG. 2, the support vectors are indicating by shading.

The optimal hyperplane parameters are represented as linear combinations of the mapped support vectors in the high dimensional space. The SVM algorithm ensures that errors on a set of vectors are minimized by assigning weights to all of the support vectors. These weights are used in computing the decision surface in terms of the support vectors. The algorithm also allows for these weights to adapt in order to minimize the error rate on the training data belonging to a particular problem. These weights are calculated during the training phase of the SVM.

Constructing an optimal hyperplane therefore becomes a constrained quadratic optimization programming problem determined by the elements of the training set and functions determining the dot products in the mapped space. The solution to the optimization problem is found using conventional intermediate optimization techniques.

Typically, the optimal hyperplane involves separating the training data without any errors. However, in some cases, training data cannot be separated without errors. In these cases, the SVM attempts to separate the training data with a minimal number of errors and separates the rest of the elements with maximal margin. These hyperplanes are generally known as soft margin hyperplanes.

In the testing phase, the SVM receives elements of a testing set to be classified in step 62. The SVM then transforms the input data vectors of the testing set by mapping them into a multi-dimensional space using support vectors as parameters in the Kernel (step 64). The mapping function is determined by the choice of a kernel which is preloaded in the SVM. The mapping involves taking a single vector and transforming it to a high-dimensional feature space so that a linear decision function can be created in this high dimensional feature space. Although the flow chart of FIG. 1 shows implicit mapping, this mapping may be performed explicitly as well. In step 66, the SVM generates a classification signal from the decision surface to indicate the membership status of each input data vector. The final result is the creation of an output classification signal, e.g., as illustrated in FIG. 2, a (+1) for a circle and an (−1) for a box.

Unfortunately, the complexity of the computation for Equation (1) scales with the number of support vectors $N_S$. The expectation of the number of support vectors is bounded below by (l−1)E(P), where P is the probability of error on a test vector using a given SVM trained on l training samples, and E[P] is the expectation of P over all choices of the l samples (e.g., see *The Nature of Statistical Learning Theory,* cited above). Thus $N_S$ can be expected to approximately scale with l. For practical pattern recognition problems, this results in a machine which is considerably slower in test phase than other systems with similar generalization performance (e.g., see *Comparison of Classifier Methods: A Case Study in Handwritten Digit Recognition,* cited above; and Y. LeCun, L. Jackel, L. Bottou, A. Brunot, C. Cortes, J. Denker, H. Drucker, I. Guyon, U. Müller, E. Säckinger, P. Simard, and V. Vapnik, *Comparison of Learning Algorithms for Handwritten Digit Recognition,* International Conference on Artificial Neural Networks, Ed. F. Fogelman, P. Gallinari, pp. 53–60, 1995).

Reduced Set Vectors

Therefore, and in accordance with the principles of the invention, we present a method and apparatus to approximate the SVM decision rule with a much smaller number of reduced set vectors. The reduced set vectors have the following properties:

They appear in the approximate SVM decision rule in the same way that the support vectors appear in the full SVM decision rule;

They are not support vectors; they do not necessarily lie on the separating margin, and unlike support vectors, they are not training samples;

They are computed for a given, trained SVM;

The number of reduced set vectors (and hence the speed of the resulting SVM in test phase) is chosen a priori;

The reduced set method is applicable wherever the support vector method is used (for example, regression estimation).

The Reduced Set

Let the training data be elements $x \in L$, where $L$ (for "low dimensional") is defined to be the $d_L$-dimensional Euclidean space $R^{d_L}$. An SVM performs an implicit mapping $\Phi: x \to \bar{x}$, $\bar{x} \in H$ (for "high dimensional"), similarly $H = R^{d_H}$, $d_H \geq \infty$. In the following, vectors in H will be denoted with a bar. The mapping $\Phi$ is determined by the choice of kernel K. In fact, for any K which satisfies Mercer's positivity constraint (e.g., see, *The Nature of Statistical Learning Theory*, and *A training algorithm for optimal margin classifiers*, cited above), there exists a pair $\{\Phi, H\}$ for which $K(x_i, x_j) = \bar{x}_i \cdot \bar{x}_j$. Thus in H, the SVM decision rule is simply a linear separating hyperplane (as noted above). The mapping $\Phi$ is usually not explicitly computed, and the dimension $d_H$ of H is usually large (for example, for the homogeneous map $K(x_i, x_j) = (x_i \cdot x_j)^P$, $$d_H = C_p^{p+d_L-1}$$

(the number of ways of choosing p objects from $p+d_L-1$ objects; thus for degree 4 polynomials and for $d_L=256$, $d_H$ is approximately 180 million).

The basic SVM pattern recognition algorithm solves a two-class problem (e.g., see *Estimation of Dependencies Based on Empirical Data, The Nature of Statistical Learning Theory, A training algorithm for optimal margin classifiers*, cited above). Given training data $x \in L$ and corresponding class labels $y_i \in \{-1, 1\}$, the SVM algorithm constructs a decision surface $\bar{\Psi} \in H$ which separates the $x_i$ into two classes (i=1, ..., l):

$$\bar{\Psi} \cdot \bar{x}_i + b \geq k_o - \xi_i, \quad y_i = +1 \tag{2}$$

$$\bar{\Psi} \cdot \bar{x}_i + b \leq k_1 + \xi_i, \quad y_i = -1 \tag{3}$$

where the $\xi_i$ are positive slack variables, introduced to handle the non-separable case (e.g., see *Support Vector Networks*, cited above). In the separable case, the SVM algorithm constructs that separating hyperplane for which the margin between the positive and negative examples in H is maximized. A test vector $x \in L$ is then assigned a class label $\{+1,-1\}$ depending on whether $\bar{\Psi} \cdot \Phi(x) + b$ is greater or less than $(k_0+k_1)/2$. A support vector $s \in L$ is defined as any training sample for which one of the equations (2) or (3) is an equality. (The support vectors are named s to distinguish them from the rest of the training data). $\Psi$ is then given by $$\bar{\Psi} = \sum_{a=1}^{N_S} \alpha_a y_a \Phi(s_a) \tag{4}$$

where $\alpha_a \geq 0$ are the weights, determined during training, $y_a \in \{+1,-1\}$ the class labels of the $s_a$, and $N_S$ is the number of support vectors. Thus in order to classify a test point x one computes $$\bar{\Psi} \cdot \bar{x} = \sum_{a=1}^{N_S} \alpha_a y_a \bar{s}_a \cdot \bar{x} = \sum_{a=1}^{N_S} \alpha_a y_a K(s_a, x). \tag{5}$$

However, and in accordance with the inventive concept, consider now a set $z_a \in L$, a=1, ..., $N_z$ and corresponding weights $\gamma_a \in R$ for which $$\bar{\Psi}' = \sum_{a=1}^{N_z} \gamma_a \Phi(z_a) \tag{6}$$

minimizes (for fixed $N_z$) the distance measure $$\rho = \|\bar{\Psi} - \bar{\Psi}'\|. \tag{7}$$

As defined herein, the $\{\gamma_a, z_a\}$, a=1, ..., $N_z$ are called the reduced set. To classify a test point x, the expansion in Equation (5) is replaced by the approximation $$\bar{\Psi}' \cdot \bar{x} = \sum_{a=1}^{N_z} \gamma_a \bar{z}_a \cdot \bar{x} = \sum_{a=1}^{N_z} \gamma_a K(z_a, x). \tag{8}$$

The goal is then to choose the smallest $N_Z \ll N_S$, and corresponding reduced set, such that any resulting loss in generalization performance remains acceptable. Clearly, by allowing $N_Z = N_S$, $\rho$ can be made zero; there are non-trivial cases where $N_Z < N_S$, and $\rho=0$ (described below). In those cases the reduced set leads to a reduction in the decision rule complexity with no loss in generalization performance. If for each $N_Z$ one computes the corresponding reduced set, $\rho$ may be viewed as a monotonic decreasing function of $N_Z$, and the generalization performance also becomes a function of $N_Z$. In this description, only empirical results are provided regarding the dependence of the generalization performance on $N_Z$.

The following should be noted about the mapping $\Phi$. The image of $\Phi$ will not in general be a linear space. $\Phi$ will also in general not be surjective, and may not be one-to-one (for example, when K is a homogeneous polynomial of even degree). Further, $\Phi$ can map linearly dependent vectors in L onto linearly independent vectors in H (for example, when K is an inhomogeneous polynomial). In general one cannot scale the coefficients $\gamma_a$ to unity by scaling $z_a$, even when K is a homogeneous polynomial (for example, if K is homogeneous of even degree, the $\gamma_a$ can be scaled to $\{+1,-1\}$, but not to unity).

Exact Solutions

In this Section, the problem of computing the minimum of $\rho$ analytically is considered. A simple, but non-trivial, case is first described.

Homogeneous Quadratic Polynomials

For homogeneous degree two polynomials, choosing a normalization of one:

$$K(x_i, x_j) = (x_i \cdot x_j)^2. \tag{9}$$

To simplify the exposition, the first order approximation, $N_Z = 1$ is computed. Introducing the symmetric tensor $$S_{\mu\nu} \equiv \sum_{i=1}^{N_S} \alpha_i y_i s_{i\mu} s_{i\nu}, \tag{10}$$

it can be found that $\rho \|\bar{\Psi} - \gamma \bar{z}\|$ is minimized for $\{\gamma, z\}$ satisfying $$S_{\mu\nu} z_\nu = \gamma z^2 z_\mu, \tag{11}$$

(repeated indices are assumed summed). With this choice of $\{\gamma, z\}$, $\rho^2$ becomes $$\rho^2 = S_{\mu\nu} S^{\mu\nu} - \gamma^2 z^4. \tag{12}$$

The largest drop in $\rho$ is thus achieved when $\{\gamma, z\}$ is chosen such that z is that eigenvector of S whose eigenvalue $\lambda=\gamma z^2$ has largest absolute size. Note that $\gamma$ can be chosen so that $\gamma=\text{sing}\{\lambda\}$, and z scaled so that $z^2=|\lambda|$:

Extending to order $N_z$, it can similarly be shown that the $z_i$ in the set $\{\gamma_i, z_i\}$ that minimize $$\rho = \left\| \Psi - \sum_{a=1}^{N_Z} \gamma_a z_a \right\| \tag{13}$$

are eigenvectors of S, each with eigenvalue $\gamma_i \|z_i\|^2$. This gives $$\rho^2 = S_{\mu\nu}S^{\mu\nu} - \sum_{a=1}^{N_Z} \gamma_a^2 \|z_a\|^4 \tag{14}$$

and the drop in $\rho$ is maximized if the $z_a$ are chosen to be the first $N_Z$ eigenvectors of S, where the eigenvectors are ordered by absolute size of their eigenvalues. Note that, since trace($S^2$) is the sum of the squared eigenvalues of S, by choosing $N_Z=d_L$ (the dimension of the data) the approximation becomes exact, i.e., $\rho=0$. Since the number of support vectors $N_S$ is often larger than $d_L$, this shows that the size of the reduced set can be smaller than the number of support vectors, with no loss in generalization performance.

In the general case, in order to compute the reduced set, $\rho$ must be minimized over all $\{\gamma_a, z_a\}$, $a=1, \ldots, N_Z$ simultaneously. It is convenient to consider an incremental approach in which on the ith step, $\{\gamma_j, z_j\}$, $j<i$ are held fixed while $\{\gamma_i, z_i\}$ is computed. In the case of quadratic polynomials, the series of minima generated by the incremental approach also generates a minimum for the full problem. This result is particular to second degree polynomials and is a consequence of the fact that the $z_i$ are orthogonal (or can be so chosen).

Table 1, below, shows the reduced set size $N_Z$ necessary to attain a number of errors $E_Z$ on the test set, where $E_Z$ differs from the number of errors $E_S$ found using the full set of support vectors by at most one error, for a quadratic polynomial SVM trained on the postal set. Clearly, in the quadratic case, the reduced set can offer a significant reduction in complexity with little loss in accuracy. Note also that many digits have numbers of support vectors larger than $d_L=256$, presenting in this case the opportunity for a speed up with no loss in accuracy.

TABLE 1

| Digit | Support Vectors | | Reduced Set | |
|---|---|---|---|---|
| | $N_S$ | $E_S$ | $N_Z$ | $E_Z$ |
| 0 | 292 | 15 | 10 | 16 |
| 1 | 95 | 9 | 6 | 9 |
| 2 | 415 | 28 | 22 | 29 |
| 3 | 403 | 26 | 14 | 27 |
| 4 | 375 | 35 | 14 | 34 |
| 5 | 421 | 26 | 18 | 27 |
| 6 | 261 | 13 | 12 | 14 |
| 7 | 228 | 18 | 10 | 19 |
| 8 | 446 | 33 | 24 | 33 |
| 9 | 330 | 20 | 20 | 21 |

General Kernels

To apply the reduced set method to an arbitrary support vector machine, the above analysis must be extended for a general kernel. For example, for the homogeneous polynomial $K(x_1, x_2)=N(x_1 \cdot x_2)^n$, setting $\partial \rho / \partial z_{1a_1}=0$ to find the first pair $\{\gamma_1, z_1\}$ in the incremental approach gives an equation analogous to Equation (11):

$$S_{\mu_1\mu_2-\mu n}z_{1\mu_2}z_{1\mu_3} \cdots z_{1\mu n}=\gamma_1\|z_1\|^{(2n-2)}z_{1\mu_1} \tag{15}$$

where $$S_{\mu_1\mu_2 \cdots \mu_n} \equiv \sum_{m=1}^{N_S} \alpha_m y_m s_{m\mu_1} s_{m\mu_2} \cdots s_{m\mu_n}. \tag{16}$$

In this case, varying $\rho$ with respect to $\gamma$ gives no new conditions. Having solved Equation (15) for the first order solution $\{\gamma_1, z_1\}$, $\rho^2$ becomes $$\rho^2 = S_{\mu_1\mu_2 \cdots \mu n} S^{\mu_1\mu_2 \cdots \mu n} - \gamma_1^2 \|z_1\|^{2n}. \tag{17}$$

One can then define $$\tilde{S}_{\mu_1\mu_2 \cdots \mu n} \equiv S_{\mu_1\mu_2 \cdots \mu n} - \gamma_1 z_{1\mu_2} \cdots z_{1\mu n} \tag{18}$$

in terms of which the incremental equation for the second order solution $z_2$ takes the form of Equation (15), with S, $z_1$ and $\gamma_1$ replaced by $\tilde{S}$, $z_2$ and $\gamma_2$, respectively. (Note that for polynomials of degree greater than 2, the $z_a$ will not in general be orthogonal). However, these are only the incremental solutions: one still needs to solve the coupled equations where all $\{\gamma_a, z_a\}$ are allowed to vary simultaneously. Moreover, these equations will have multiple solutions, most of which will lead to local minima in $\rho$. Furthermore, other choices of K will lead to other fixed point equations. While solutions to Equation (15) could be found by iterating (i.e. by starting with arbitrary z, computing a new z using Equation (15), and repeating), the method described in the next Section proves more flexible and powerful.

Unconstrained Optimization Approach

Provided the kernel K has first derivatives defined, the gradients of the objective function $F \equiv \rho^2/2$ with respect to the unknowns $\{\gamma_i, z_i\}$ can be computed. For example, assuming that $K(s_m, s_n)$ is a function of the scalar $s_m \cdot s_n$:

$$\frac{\partial F}{\partial \gamma_k} = -\sum_{m=1}^{N_S} \alpha_m y_m K(s_m \cdot z_k) + \sum_{j=1}^{N_Z} \gamma_j K(z_j \cdot z_k) \tag{19}$$

$$\frac{\partial F}{\partial z_{k\mu}} = -\sum_{m=1}^{N_S} \gamma_k \alpha_m y_m K'(s_m \cdot z_k) s_{m\mu} + \sum_{j=1}^{N_Z} \gamma_j \gamma_k K'(z_j \cdot z_k) z_{j\mu} \tag{20}$$

Therefore, and in accordance with the principles of the invention, a (possibly local) minimum can then be found using unconstrained optimization techniques.

The Algorithm

First, the desired order of approximation, $N_z$, is chosen. Let $X_i \equiv \{\gamma_i, z_i\}$. A two-phase approach is used. In phase 1 (described below), the $X_i$ are computed incrementally, keeping all $z_j$, $j<i$, fixed.

In phase 2 (described below), all $X_i$ are allowed to vary.

It should be noted that the gradient in Equation (20) is zero if $\gamma_k$ is zero. This fact can lead to severe numerical instabilities. In order to circumvent this problem, phase 1 relies on a simple "level crossing" theorem. The algorithm is as follows. First, $\gamma_i$ is initialized to +1 or −1; $z_i$ is initialized with random values. $z_i$ is then allowed to vary, while keeping $\gamma_i$ fixed. The optimal value for $\gamma_i$, given that $z_i$, $X_j$, j<i are fixed, is then computed analytically. F is then minimized with respect to both $z_i$ and $\gamma_i$ simultaneously. Finally, the optimal $\gamma_j$ for all j≦i is computed analytically, and are given by $\Gamma = Z^{-1}\Delta$, where vectors $\Delta$, $\Gamma$ and Z are given by (see equation (19)):

$$\Gamma_j \equiv \gamma_j, \quad (21)$$

$$\Delta j \equiv \sum_{a=1}^{N_s} \alpha_a y_a K(s_a, z_j), \text{ and} \quad (22)$$

$$Z_{jk} \equiv K(z_j, z_k). \quad (23)$$

Since Z is positive definite and symmetric, it can be inverted efficiently using the well-known Choleski decomposition.

Thus, the first phase of the algorithm proceeds as follows:

[1] choose $\gamma_1$'+1 or −1 randomly, set $z_1$ to a selection of random values;

[2] vary $z_1$ to minimize F;

[3] compute the $\gamma_1$, keeping $z_1$ fixed, that maximally further reduces F;

[4] allow $z_1$, $\gamma_1$ to vary together to further reduce F;

[5] repeat steps [1] through [4] T times keeping the best answer;

[6] fix $z_1$, $\gamma_1$, choose $\gamma_2$=+1 or −1 randomly, set $z_2$ to a selection of random values;

[7] vary $z_2$ to minimize F;

[8] then fixing $z_2$ (and $z_1$, $\gamma_1$) compute the optimal $\gamma_2$ that maximally further reduces F;

[9] then let $\{z_2, \gamma_2\}$ vary together, to further reduce F;

[10] repeat steps [6] to [9] T times, keeping the best answer; and

[11] finally, fixing $z_1$, $z_2$, compute the optimal $\gamma_1$, $\gamma_2$ (as shown above in equations (21)–(23)) that further reduces F.

This procedure is then iterated with $\{z_3, \gamma_3\}$ and $\{z_4, \gamma_4\}$, and so on up to $\{z_{N_z}, \gamma_{N_z}\}$.

Numerical instabilities are avoided by preventing $\gamma_i$ from approaching zero. The above algorithm ensures this automatically: if the first step, in which $z_i$ is varied while $\gamma_i$ is kept fixed, results in a decrease in the objective function F, then when $\gamma_i$ is subsequently allowed to vary, it cannot pass through zero, because doing so would require an increase in F (since the contribution of $\{z_i, \gamma_i\}$ to F would then be zero).

Note that each computation of a given $\{z_i, \gamma_i\}$ pair is repeated in phase 1 several (T) times, with different initial values for the $X_i$. T is determined heuristically from the number M of different minima in F found. For the above-mentioned data sets, M was usually 2 or 3, and T was chosen as T=10.

In phase 2, all vectors $X_i$ found in phase 1 are concatenated into a single vector, and the unconstrained minimization process then applied again, allowing all parameters to vary. It should be noted that phase 2 often results in roughly a factor of two further reduction in the objective function F.

In accordance with the principles of the inventions, the following first order unconstrained optimization method was used for both phases. The search direction is found using conjugate gradients. Bracketing points $x_1$, $x_2$ and $x_3$ are found along the search direction such that $F(x_1) > F(x_2) < F(x_3)$. The bracket is then balanced (for balancing techniques, see, e.g., W. H. Press, S. A. Teukolsky, W. T. Vetterling and B. P. Flannery, *Numerical Recipes in C*, Second Edition, Cambridge University Press, 1992). The minimum of the quadratic fit through these three points is then used as the starting point for the next iteration. The conjugate gradient process is restarted after a fixed, chosen number of iterations, and the whole process stops when the rate of decrease of F falls below a threshold. It should be noted that this general approach gave the same results as the analytic approach when applied to the case of the quadratic polynomial kernel, described above.

Experiments

The above approach was applied to the SVM that gave the best performance on the postal set, which was a degree 3 inhomogeneous polynomial machine (for the latter see, e.g., *The Nature of Statistical Learning Theory*, cited above). The order of approximation, $N_z$, was chosen to give a factor often speed up in test phase for each two-class classifier. The results are given in Table 2 (shown below). The reduced set method achieved the speed up with essentially no loss in accuracy. Using the ten classifiers together as a ten-class classifier (for the latter, see, e.g., *The Nature of Statistical Learning Theory*, and *Support Vector Networks*, cited above) gave 4.2% error using the full support set, as opposed to 4.3% using the reduced set. Note that for the combined case, the reduced set gives only a factor of six speed up, since different two class classifiers have some support vectors in common, allowing the possibility of caching. To address the question as to whether these techniques can be scaled up to larger problems, the study was repeated for a two-class classifier separating digit 0 from all other digits for the NIST set (60,000 training, 10,000 test patterns). This classifier was also chosen to be that which gave best accuracy using the full support set: a degree 4 polynomial. The full set of 1,273 support vectors gave 19 test errors, while a reduced set of size 127 gave 20 test errors.

TABLE 2

| | Support Vectors | | Reduced Set | |
|---|---|---|---|---|
| Digit | $N_S$ | $E_S$ | $N_Z$ | $E_Z$ |
| 0 | 272 | 13 | 27 | 13 |
| 1 | 109 | 9 | 11 | 10 |
| 2 | 380 | 26 | 38 | 26 |
| 3 | 418 | 20 | 42 | 20 |
| 4 | 392 | 34 | 39 | 32 |
| 5 | 397 | 21 | 40 | 22 |
| 6 | 257 | 11 | 26 | 11 |
| 7 | 214 | 14 | 21 | 13 |
| 8 | 463 | 26 | 46 | 28 |
| 9 | 387 | 13 | 39 | 13 |
| Totals: | 3289 | 187 | 329 | 188 |

(Note that tests were also done on the full 10 digit NIST giving a factor of 50 speedup with 10% loss of accuracy; see C. J. C. Burges, B. Schökopf, Improving the Accuracy and Speed of Support Vector Machines, in press, NIPS '96.)

Illustrative Embodiment

Turning now to FIG. 3, an illustrative flow chart embodying the principles of the invention is shown for use in a training phase of an SVM. Input training data is applied to an SVM (not shown) in step 100. The SVM is trained on this input data in step 105 and generates a set of support vectors in step 110. A number of reduced set vectors is selected in step 135. In step 115, the unconstrained optimization approach (described above) is used to generate reduced set vectors in step 120. These reduced set vectors are used to test a set of sample data (not shown) in step 125. Results from this test are evaluated in step 130. If the test results are acceptable (e.g., as to speed and accuracy), then the reduced set vectors are available for subsequent use. If the test results are not acceptable, then the process of determining the reduced set vectors is performed again. (In this latter case, it should be noted that the test results (e.g., in terms of speed and/or accuracy) could suggest a further reduction in the number of reduced set vectors.)

Once the reduced set vectors have been determined, they are available for use in a SVM. A method for using these reduced set vectors in a testing phase is shown in FIG. 4. In step 215, input data vectors from a test set are applied to the SVM. In step 220, the SVM transforms the input data vectors of the testing set by mapping them into a multi-dimensional space using reduced set vectors as parameters in the Kernel. In step 225, the SVM generates a classification signal from the decision surface to indicate the membership status of each input data vector.

As noted above, a number, m, of reduced set vectors are in the reduced set. These reduced set vectors are determined in the above-mention training phase illustrated in FIG. 3. If the speed and accuracy data suggest that less than m reduced set vectors can be used, an alternative approach can be taken that obviates the need to recalculate a new, and smaller, set of reduced set vectors. In particular, a number of reduced set vectors, x, are selected from the set of m reduced set vectors, where x<m. In this case, the determination of how many reduced set vectors, x, to use is empirically determined, using, e.g., the speed and accuracy data generated in the training phase. However, there is no need to recalculate the values of these reduced set vectors.

Figure 5:
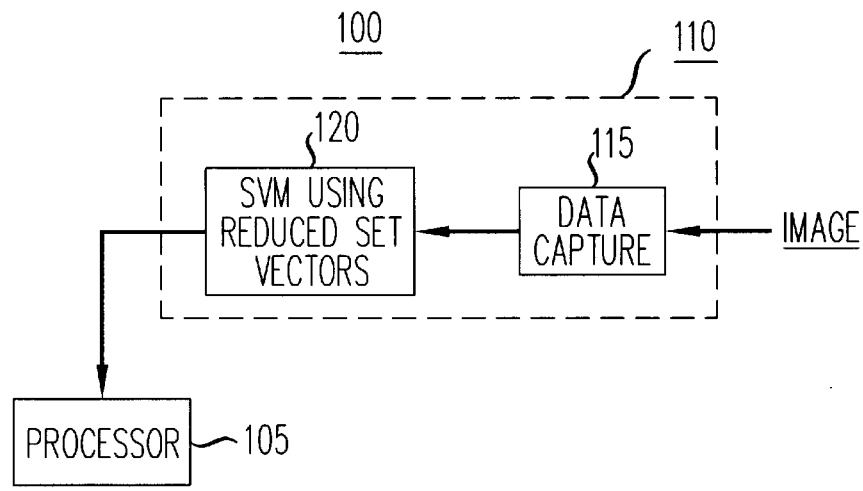
FIG. 5 shows a block diagram of a portion of a recognition system embodying the principles of the invention.

An illustrative embodiment of the inventive concept is shown in FIG. 5 in the context of pattern recognition. Pattern recognition system 100 comprises processor 105 and recognizer 110, which further comprises data capture element 115, and SVM 120. Other than the inventive concept, the elements of FIG. 5 are well-known and will not be described in detail. For example, data input element 115 provides input data for classification to SVM 120. One example of data input element 115 is a scanner. In this context, the input data are pixel representations of an image (not shown). SVM 120 operates on the input data in accordance with the principles of the invention using reduced set vectors. During operation, or testing, SVM 120 provides a numerical result representing classification of the input data to processor 105 for subsequent processing. Processor 105 is representative of a stored-program-controlled processor such as a microprocessor with associated memory. Processor 105 additionally processes the output signals of recognizer 110, such as, e.g., in an automatic teller machine (ATM).

The system shown in FIG. 5 operates in two modes, a training mode and an operating (or test) mode. An illustration of the training mode is represented by the above-described method shown in FIG. 3. An illustration of the test mode is represented by the above-described method shown in FIG. 4.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, the inventive concept is also applicable to kernel-based methods other than support vector machines, which can also be used for, but are not limited to, regression estimates, density estimation, etc.

What is claimed is:

1. A method for using a support vector machine, the method comprising the steps of:

receiving input data signals; and using the support vector machine operable on the input data signals for providing an output signal, wherein the support vector machine utilizes reduced set vectors, wherein the reduced set vectors were a priori determined during a training phase using an unconstrained optimization approach other than an eigenvalue computation used for homogeneous quadratic kernels wherein the training phase further comprises the steps of:

receiving elements of a training set;

generating a set of support vectors, the number of support vectors being NS;

selecting a number m of reduced set vectors, where $m \leq NS$; and generating the number m of reduced set vectors using the unconstrained optimization approach.

2. The method of claim 1 wherein the input data signals represent different patterns and the output signal represents a classification of the different patterns.

3. A method for using a support vector machine, the method comprising the steps of:

receiving input data signals; and using the support vector machine operable on the input data signals for providing an output signal, wherein the support vector machine utilizes reduced set vectors, wherein the reduced set vectors were a priori determined during a training phase using an unconstrained optimization approach other than an eigenvalue computation used for homogeneous quadratic kernels wherein the training phase further comprises the steps of:

training the support vector machine for determining a number, NS, of support vectors; and using the unconstrained optimization technique to determine the reduced set vectors, where a number of reduced set vectors is m, where $m \leq NS$.

* * * * *